United States Patent [19]
Robinson et al.

[11] Patent Number: 5,404,760
[45] Date of Patent: Apr. 11, 1995

[54] BLADE PATH THERMOCOUPLE AND EXHAUST GAS EXTRACTION PROBE FOR COMBUSTION TURBINES

[75] Inventors: George J. Robinson, Ovideo; Richard J. Antos, Winter Springs, both of Fla.

[73] Assignee: Westinghouse Electric Corporation, Pittsburgh, Pa.

[21] Appl. No.: 141,755

[22] Filed: Oct. 27, 1993

[51] Int. Cl.$^6$ .............................................. G01N 1/10
[52] U.S. Cl. .................................. 73/863.11; 73/863; 73/83; 73/864; 73/81
[58] Field of Search ........... 73/863.11, 863.83, 863.81, 73/864.81, 865.5; 374/141, 142, 144, 147, 148; 415/118

[56] References Cited
U.S. PATENT DOCUMENTS 4,355,539 10/1982 Schatz .............................. 73/863.11
4,438,653 3/1984 Beentjes ........................... 73/863.11
5,185,996 2/1993 Smith et al. ........................ 415/118

Primary Examiner—Richard E. Chilcot, Jr.
Assistant Examiner—Max H. Noori

[57] ABSTRACT

A dual function probe for measuring blade path temperature and for extracting exhaust flow gases from a combustion turbine comprises an elongate tubular member having an open end and a sealed end. An elongate thermocouple element is centrally disposed within the tubular member to provide a thermocouple function. At least a portion of the tubular member is adapted for insertion through the exhaust cylinder and diffuser of the combustion turbine and into the flow path of the turbine exhaust gases. An on-off valve is coupled to the tubular member proximate the sealed end thereof to allow exhaust flow gases that enter the open end of the tubular member to be extracted from the tubular member for analysis.

17 Claims, 4 Drawing Sheets

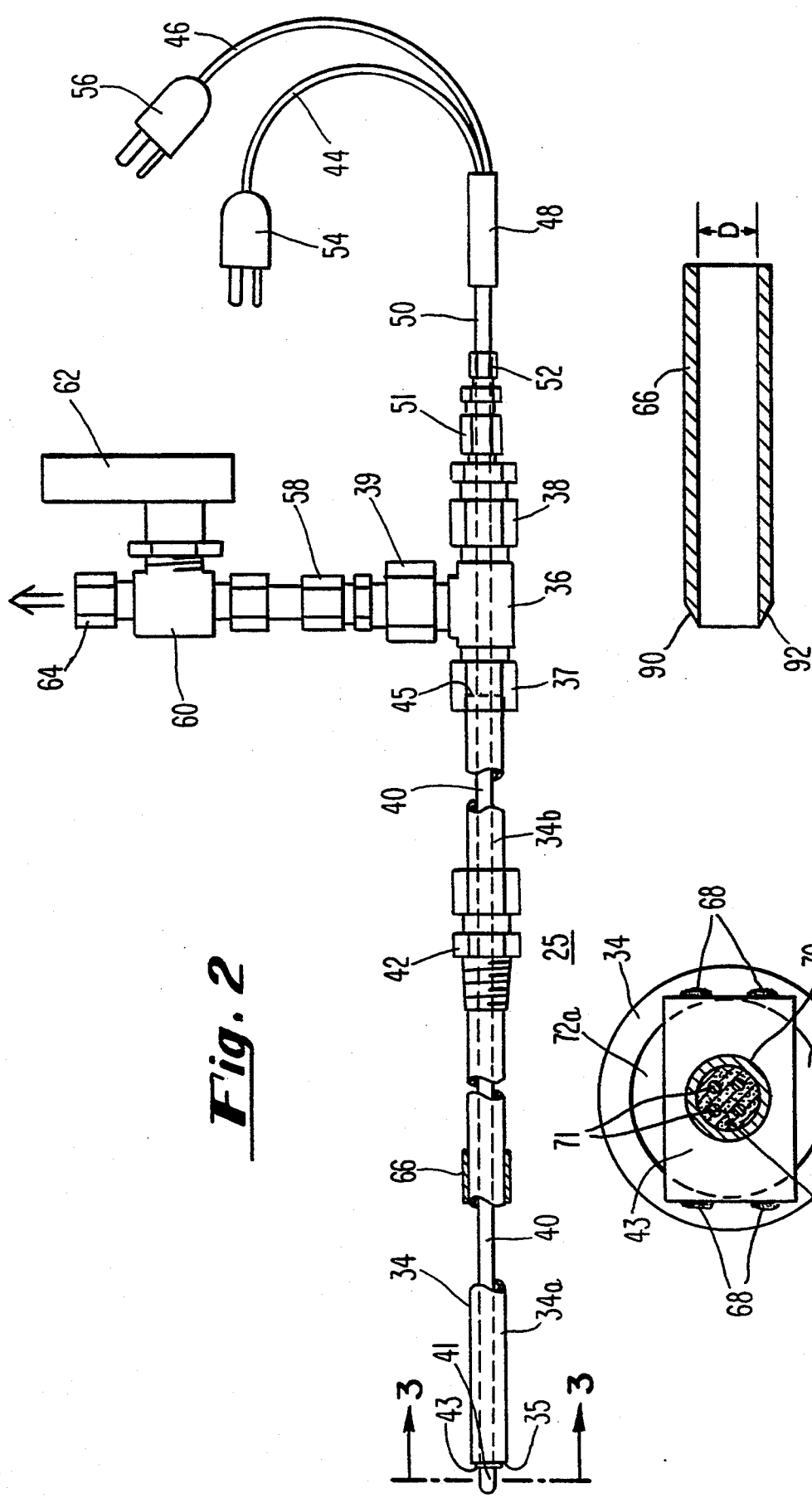

BLADE PATH THERMOCOUPLE AND EXHAUST GAS EXTRACTION PROBE FOR COMBUSTION TURBINES

BACKGROUND OF THE INVENTION

The present invention relates to a dual function probe for measuring combustion turbine exhaust characteristics. More specifically, the present invention relates to a dual function probe for measuring blade path temperature at the exhaust cylinder diffuser inlet of a combustion turbine and for extracting exhaust flow gases therefrom to facilitate emissions analysis.

In an axial flow combustion (gas) turbine, the hot gas exhausting from the last row of turbine blades is directed through an exhaust diffuser. The exhaust diffuser is formed by inner and outer flow liners disposed between an exhaust cylinder and a bearing housing. The flow liners serve to create a smooth flow path for the hot gas. They also act as a barrier which prevents the flow of hot gas directly over the exhaust cylinder and bearing housing, thereby preventing excessive temperatures and thermal stresses in these components.

Efficient operation of a combustion turbine requires constant monitoring of various aspects of the combustion process. One parameter of the combustion process that effects combustion efficiency is the blade path temperature, i.e., the temperature in the exhaust cylinder just aft of the last row of turbine blades. It is desirable, therefore, to periodically sample the blade path temperature in the combustion turbine.

Blade path temperature is usually measured using one or more thermocouple assemblies that are inserted through corresponding guides in the exhaust cylinder of the turbine such that the measuring junctions of the thermocouple assemblies are positioned within the flow path of the turbine exhaust near the last row of turbine blades. Typically, multiple thermocouple assemblies are inserted at equally spaced points around the annulus of the exhaust cylinder. Each thermocouple provides a blade path temperature reading for a respective one of the turbine's combustors. The measuring junction of each thermocouple is situated downstream from a respective combustor near the turbine blade aft annulus. In this manner, blade path temperature can be monitored for each combustor separately.

FIG. 6 provides a detailed view of a prior art thermocouple assembly 100 for use in measuring blade path temperature. As shown, the thermocouple assembly 100 comprises a thermocouple element 103 partially disposed within a first tubular member 101 (sometimes referred to as a "thermowell") so that the measuring junction 105 of the element 103 protrudes slightly from the forward end face 116 of the tubular member 101. The tubular member 101 has a narrow bore 104 at its forward end to provide a close fit with the thermocouple element 103. A slightly larger bore 102 extends through the remainder of the tubular member. The rearward end 115 of the first tubular member is coupled to an aspirating tee 112 which, in turn, is coupled to a second tubular member 111. A terminal head assembly 110 is coupled to the far end of the second tubular member 111.

As shown, the thermocouple element extends rearward of the assembly 100 through the aspirating tee 112 and second tubular member 111 to the terminal head 110. The leads of the thermocouple element are terminated on a terminal block 109 in the terminal head assembly 110. Extension wires (not shown) may be used to electrically connect the terminated thermocouple leads to a supervisory control device which can process the thermocouple data to calculate the temperature of the measuring junction 105. A male mating fixture 113 is integrally formed at the rearward end 115 of the first tubular member 101 for coupling the thermocouple assembly 100 to one of the guides in the exhaust cylinder after inserting the forward end 116 of the tubular member 101 through the guide and into the flow path of the turbine exhaust gases. Thus, in use, the aspirating tee 114, second tubular member 111 and terminal head assembly 110 remain external to the exhaust cylinder of the turbine.

Although the narrow bore 104 provides a close fit with the thermocouple element 103, when the forward end 116 of the assembly 100 is positioned in the flow path of the turbine exhaust, some of the exhausting gases may inadvertently enter the first tubular member 101 through the narrow bore 104. To prevent these extremely hot gases from escaping past the first tubular member 101 and damaging the terminal head assembly 110, an high temperature sealing gasket 106 is used to seal the rearward end 115 of the tubular member 101. The gasket 106 is forcibly seated against the end face of the large bore 102 by a stop ring 107 which is fabricated to the gasket 106 and spring biased toward the end face of the larger bore 102 by a spring 108 in the terminal head assembly 110. As shown, the thermocouple element 103 extends through the center of the gasket 107 without breaking the seal.

During operation, if the sealing gasket 106 is not properly seated against the end face of the bore 102, some exhaust gases may leak past the sealing gasket 106 into the second tubular member 111. The aspirating tee 112 operates to vent any leaked gas out of the second tubular member 111 to reduce the risk of damage to the terminal head assembly 110. Typically, a short piece of tubing (not shown) is connected to the outlet 114 of the aspirating tee 112 to direct the leaked gases to an innocuous location on the outside of the exhaust cylinder, such as, for example, under an insulating blanket surrounding the exhaust cylinder. Clearly, however, the narrow bore 104 and spring-loaded sealing gasket 106 of the prior art thermocouple assembly 100 are designed respectively to prevent any exhaust gases from entering into or escaping from the first tubular member 101. Should the sealing gasket 106 fail, the aspirating tee 112 merely serves as a protective bleed to prevent damage to the terminal head 110 and second tubular member 111.

With the increasing emphasis on the environment, it is important to ensure that the turbine exhaust does not exceed acceptable emissions levels. Measuring exhaust emissions is therefore an important aspect of combustion turbine operation. In the past, emissions levels have been monitored at the turbine exhaust stack using sensors or probes inserted into the exhaust stack. Because the exhaust stack is situated downstream from the individual turbine combustors, the individual emissions level of each combustor cannot be determined at the exhaust stack. It would therefore be desirable to provide a method or apparatus for extracting flow path gases from the exhaust cylinder of the turbine at a position much closer to the individual turbine combustors.

One possible solution would be to remove the thermocouple assemblies from their respective guides and replace the thermocouple assemblies with gas extraction probes. Exhaust gases flowing directly downstream from each combustor could then be extracted and independently analyzed. Because the thermocouple assemblies would have to be removed, however, blade path temperature readings could not be obtained during emissions testing.

Another possible solution would be to machine an additional set of guides through the exhaust cylinder so that gas extraction probes could be inserted into the flow path proximate the thermocouple assemblies. Although this would allow blade path temperature readings to be maintained during emissions testing, the additional set of probe guides would unacceptably increase the production costs of the turbine.

It would therefore be desirable to provide a means for extracting flow path gases from the exhaust cylinder of a combustion turbine near the turbine blade aft annulus without interrupting blade path temperature readings and without requiring modifications to the exhaust cylinder.

SUMMARY OF THE INVENTION

Accordingly, it is the general object of the current invention to provide a means for extracting flow path gases from the exhaust cylinder of a combustion turbine near the turbine blade aft annulus without interrupting blade path temperature readings and without requiring modifications to the exhaust section of the turbine.

Briefly, this object, as well as other objects of the present invention, is accomplished in a dual function probe that provides both a blade path thermocouple function and the ability to extract exhaust flow path gases from the combustion turbine. The dual function probe of the present invention is designed to insert into an existing thermocouple assembly guide in the exhaust cylinder of the turbine.

According to a preferred embodiment of the present invention, the dual function probe comprises an elongate tubular member having an open end and a sealed end. At least a portion of the tubular member is adapted for insertion through an existing thermocouple assembly guide and into the flow path of the turbine exhaust. An elongate thermocouple element is centrally disposed within the tubular member. The inner diameter of the tubular member is sufficiently larger than the diameter of the thermocouple element to allow exhaust gases to enter the open end of tubular member. An on-off valve is coupled to the tubular member proximate its sealed end. When the valve is open, exhaust flow gases that enter the open end of the tubular member are able to exit the tubular member through the valve. The terminal end of the thermocouple element extends outward through the sealed end of the tubular member to connect with an external control device.

In a most preferred embodiment, a union tee is used to couple the on-off valve to the elongate tubular member. An inlet of the union tee is coupled to the rearward end of the tubular member, and the terminal end of the thermocouple element extends outward through a first outlet of the union tee. The first outlet of the union tee has a reduced diameter substantially equal to the diameter of the terminal end of the thermocouple element thereby forming a seal around the terminal end of the thermocouple element. The sealed outlet defines the sealed end of the tubular member. The on-off valve is coupled to a second outlet of the union tee.

Preferably, the measuring junction of the thermocouple element protrudes slightly from the open end of the tubular member and comprises a duplex type measuring junction. A support plate may be coupled to the open end face of the tubular member to support the thermocouple element in its centrally disposed position within the tubular member. A sleeve may be slidably fitted over the outer surface of at least a portion of the tubular member to provide additional support and vibration damping to the forward end of the tubular member when the probe is inserted into one of the exhaust cylinder guides. A vacuum pump may be coupled through interconnection tubing to the outlet of the on-off valve to facilitate extraction of exhaust flow gases from the tubular member. A chemical analyzer may be coupled to the outlet of the on-off valve for analyzing the exhaust flow gases extracted through the valve. Damage to the chemical analyzer from the extreme heat of the extracted gases may be prevented with a cooling device coupled between the valve and the chemical analyzer.

BRIEF DESCRIPTION OF THE DRAWINGS

FIG. 2 is a side view of a dual function probe according to a preferred embodiment of the present invention.

FIG. 3 is front end view of the dual function probe of FIG. 2 taken along line 3—3 of FIG. 2.

FIG. 4 is a longitudinal cross-section of the sleeve of FIG. 2.

DESCRIPTION OF THE PREFERRED EMBODIMENT

Figure 1:
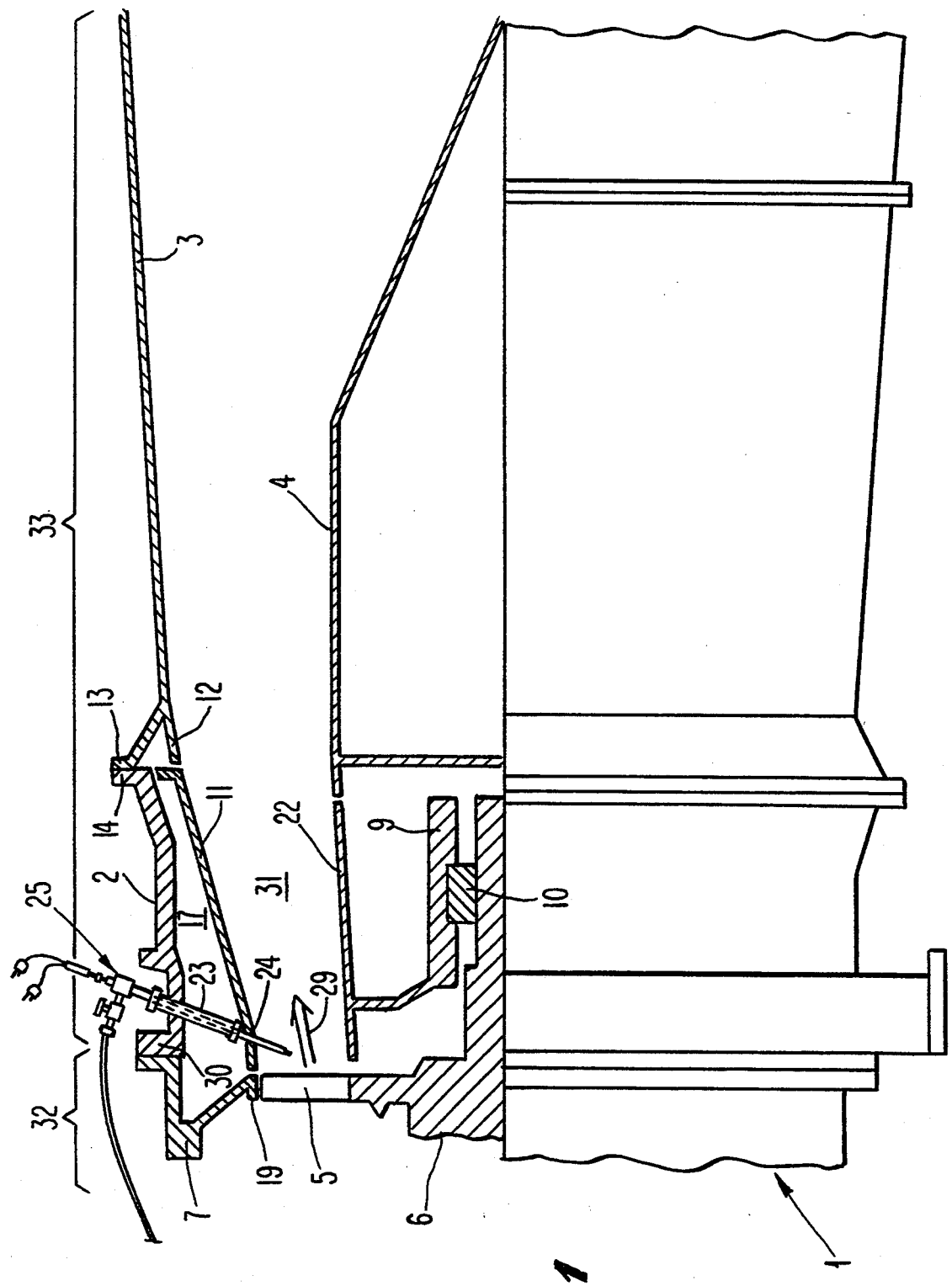
FIG. 1 is a partial longitudinal cross-section through the exhaust section of a gas turbine.

Referring to the drawings, there is shown in FIG. 1 the exhaust section 33 of a combustion turbine 1. The exhaust section 33 is comprised of an exhaust cylinder 2 which encloses a diffuser formed by approximately cylindrical inner 22 and outer 11 flow liners. The exhaust cylinder 2 is bolted at its upstream flange 30 to a turbine cylinder 7 in the turbine section 32 of the combustion turbine. A shroud 19 attached to the turbine cylinder 7 encircles the tips of a last row of turbine blades 5. Hot gas 29 exhausting from the last row of blades 5 in the turbine section 32 flows through the exhaust section 33. From the exhaust section 33 the hot gas 29 may be either vented to the atmosphere, in a simple cycle power plant, or directed to a heat recovery steam generator, in a combined cycle power plant.

The inner 22 and outer 11 flow liners form a portion of the flow path 31 for the exhaust gas 29. The inner flow liner 22 encloses a bearing housing 9 that contains a bearing 10 that supports a turbine blade rotor 6. The bearing housing 9 is supported by struts (not shown) that extend between the bearing housing 9 and the exhaust cylinder 2. An exhaust manifold outer cylinder 3 extends downstream from the exhaust cylinder 2 and is bolted at its upstream flange 13 to the exhaust cylinder downstream flange 14. A flow guide 12 extends from the exhaust manifold outer cylinder 3 inboard of the flange 13 so as to form a smooth flow path with the outer flow liner 11. An exhaust manifold inner cylinder 4 extends downstream from the inner flow liner 22.

Figure 6:
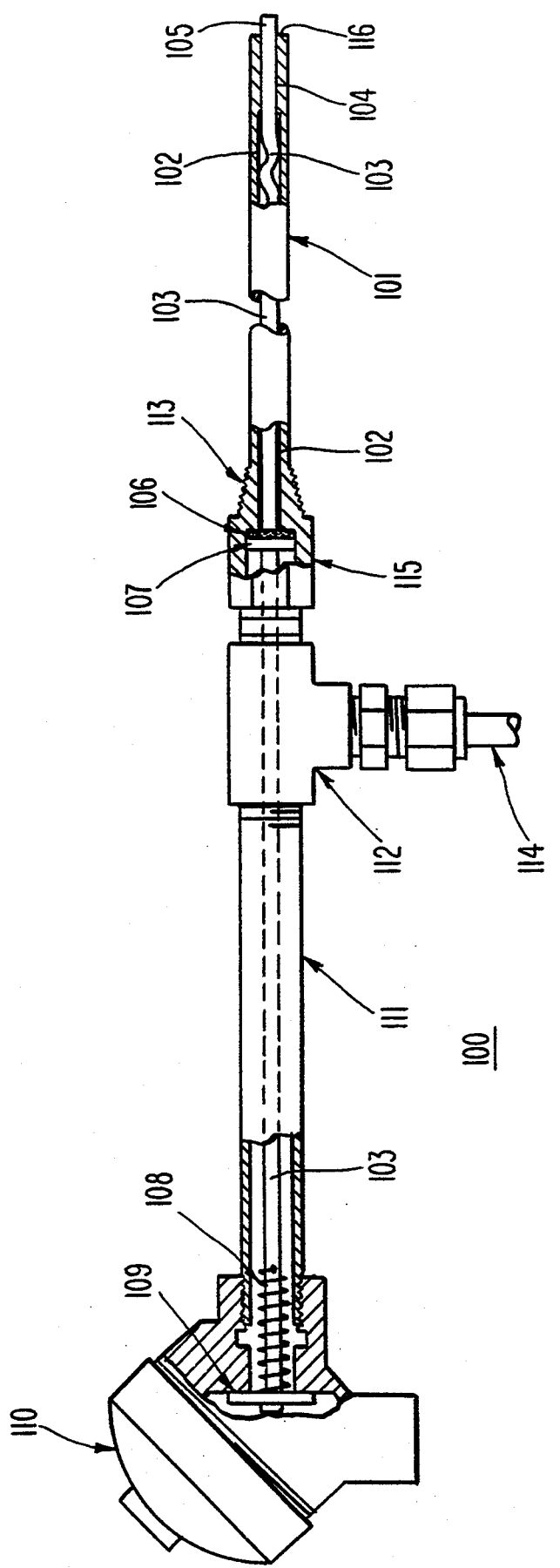
FIG. 6 shows a prior art thermocouple assembly for measuring blade path temperature.

As described above, combustion turbines typically have a number of longitudinal guides, such as guide 23, spaced around the annulus of the exhaust cylinder 2. Each guide extends through the exhaust cylinder 2 to a point just above an aperture, e.g. aperture 24, in the outer flow liner 11 of the exhaust diffuser. Prior art thermocouple assemblies, such as the one shown in FIG. 6, are typically inserted into each of the guides to obtain blade path temperature measurements at various points around the diffuser inlet. As shown, however, a dual function probe 25 according to the present invention may be inserted into the guide 23 in place of the prior art thermocouple assembly. As will become evident hereinafter, the dual function probe 25 of the present invention provides both a blade path thermocouple function and the ability to extract flow path gases from the exhaust section of the combustion turbine.

FIG. 2 shows details of the dual function probe 25 of FIG. 1 according to a preferred embodiment of the present invention. As shown, the dual function probe 25 comprises an elongate tubular member 34 having a forward open end 35 and a rearward open end 45. Preferably, the tubular member 34 is made of stainless steel capable of continuous operation in temperatures up to 1300° F. The rearward open end 45 of the tubular member 34 is coupled to the inlet 37 of a union tee 36 having first and second outlets 38 and 39, respectively. A series of reducers 51, 52 are coupled to the first outlet 38 to effectively reduce the diameter of the first outlet 38 for purposes described hereinafter.

An elongate thermocouple element 40 is centrally disposed within the tubular member 34. As shown, the inner diameter of the tubular member 34 is sufficiently larger than the outer diameter of the thermocouple element 40 to form an annular space within the tubular member 34. For example, the inner diameter of the tubular member 34 may be approximately twice the outer diameter of the thermocouple element 40. Preferably, the thermocouple element 40 has a high integrity, duplex type, grounded measuring junction 41 formed by gathering (not twisting) the four element leads together and inserting a miniature ring around the gathered leads followed by a high temperature stainless steel braze capable of withstanding temperatures approaching 2000° F. The measuring junction 41 of the thermocouple element 40 protrudes past the forward open end 35 of the tubular member 34 and is supported by a support plate 43 to maintain the thermocouple element 40 in its centrally disposed position.

The terminal end 50 of the thermocouple element 40 extends outward through the first outlet 38 of the union tee 36 and through reducers 51 and 52. Reducer 52 has a diameter substantially equal to the outer diameter of the terminal end 50 of the thermocouple element 40 so as to form a seal around the terminal end 50. Preferably, the sealing capability of the second reducer 52 is sufficient to withstand differential pressures of up to 150 psia in operating temperatures of at least 1000° F. The union tee 36, with its sealed outlet 38, defines a sealed end of the tubular member 34.

The terminal end 50 of the thermocouple element 40 extends into a potted transition assembly 48 wherein the respective element leads of the duplex type measuring junction are spliced, by means of spot welding, to corresponding extension wires 44, 46 that extend outward from the transition assembly 48. Male connectors 54, 56 are provided at the ends of the respective extension wires 44, 46 for connecting each element circuit of the duplex type measuring junction to an external control device (not shown). Preferably, the potted transition assembly 48, the extension wires 44, 46 and the male connectors 54, 56 are rated for continuous operation in temperatures up to 500° F.

An on-off valve 60 is coupled through reducer 58 to the second outlet 39 of the union tee 36. Preferably, the on-off valve 60 comprises a stainless steel ball valve. When the valve 60 is opened by turning the handle 62, exhaust flow gases that enter the forward end 35 of the tubular member are able to exit through the outlet 64 of the valve. When the valve 60 is closed, no gases can escape.

A tubular sleeve 66 may be slidingly fitted over the surface of at least a portion of the tubular member 34 as shown. As explained hereinafter in greater detail, when the lower portion 34a of the tubular member 34 is inserted through the guide 23 in the exhaust section 33 of the combustion turbine 1 (see FIG. 1), the sleeve 66 fits tightly within the guide 23 near the aperture 24 in the outer flow liner 11 to provide additional support and vibration damping to the tubular member 34. A connector 42 is fitted over the tubular member 34 and is positioned to connect with a mating fixture on the guide 23, as described hereinafter. During assembly, connector 42 may be slid onto the tubular member 34 from the forward end 35, or alternatively, the connector 42 may be slid onto the tubular member 34 from the rearward end 45 prior to coupling the rearward end 45 to the inlet 37 of the union tee 36.

FIG. 3 is a front end view of the dual function probe 25 of FIG. 2 taken along line 3—3. As shown, the support plate 43 is preferably rectangular in shape and is tack welded to the tubular member 34 at points 68. An aperture 70 is provided in the support plate 43 through which the measuring junction 41 of the thermocouple element 40 may protrude. The support plate 43 supports the protruding measuring junction and thereby maintains the thermocouple element 40 in its centrally disposed position within the tubular member 34. The width of the support plate 43 is sized to form ample circular segment shaped openings 72a and 72b with the front end face of the tubular member 34. These are the openings through which exhaust gases will enter the tubular member 34. Also shown in FIG. 3 are the four element leads 71 of the duplex type measuring junction 41 of the thermocouple element 40.

FIG. 4 shows further details of the sleeve 66 of FIG. 2. Preferably, the sleeve 66 is made of stainless steel and has an inner diameter D substantially equal to the outer diameter of the tubular member 34 so as to fit tightly over the tubular member 34. The insertion end of the sleeve is preferably chamfered at points 90 and 92 to facilitate insertion of the tubular member 34 and sleeve 66 into one of the guides 23 in the exhaust section 33 of the turbine. During assembly of the dual function probe 25, the sleeve 66 may be slid onto the tubular member 34 from the forward end 35, or alternatively, the sleeve 66 may be slid onto the tubular member 34 from the rearward end 45 prior to coupling the rearward end 45 to the inlet 37 of the union tee 36.

Figure 5:
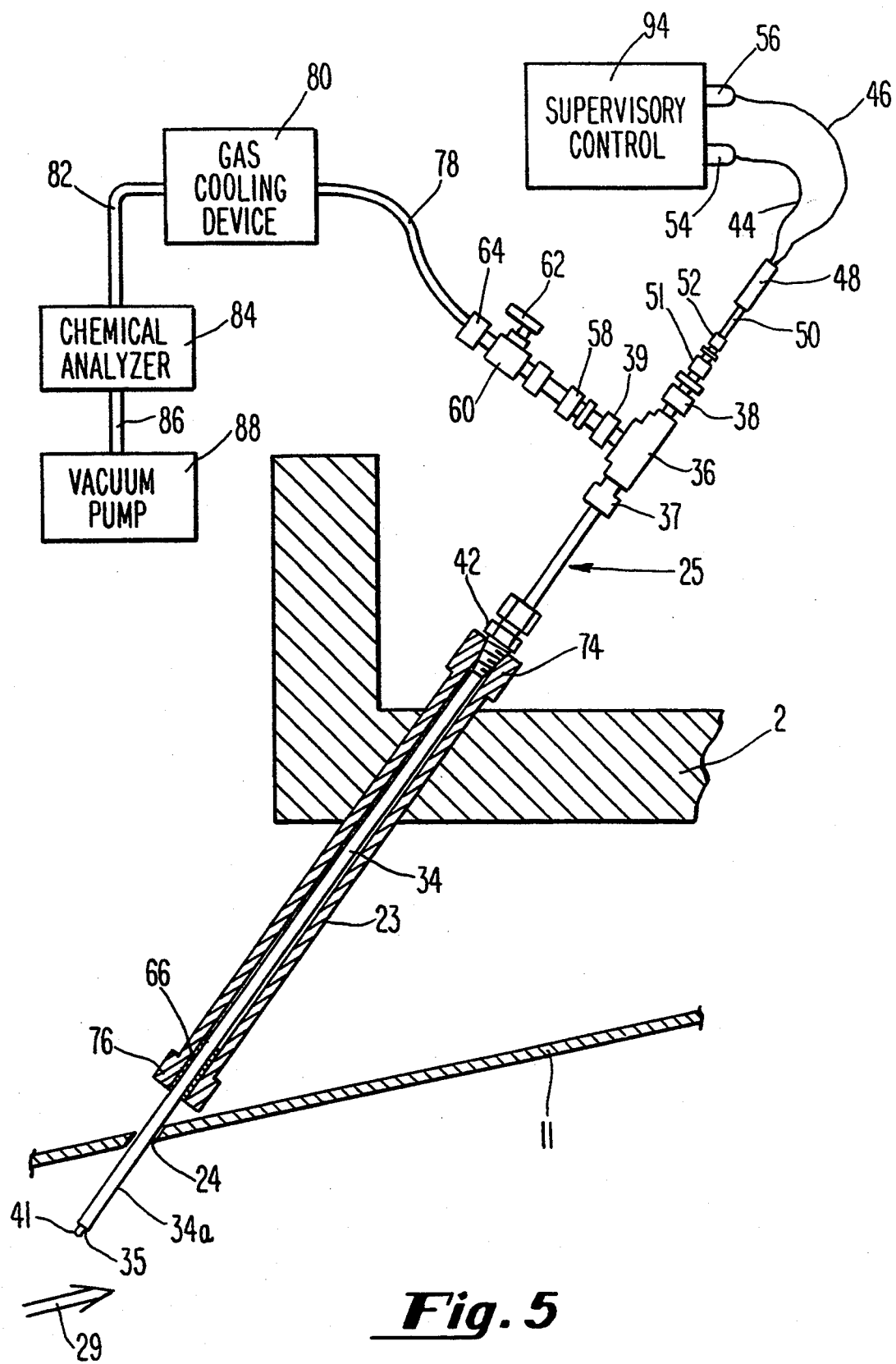
FIG. 5 is an enlarged view of a portion of FIG. 1 illustrating further details of the placement of the dual function probe of the present invention.

As best shown in FIG. 5, in use, the dual function probe 25 of the present invention is inserted through one of the guides 23 in the exhaust section 33 of the combustion turbine 1. The guide 23 extends through the exhaust cylinder 2 to a point just above an aperture 24 in the outer flow liner 11 of the exhaust diffuser. The lower portion 34a of the tubular member 34 extends past the end 76 of the guide 23, through the aperture 24, and into the exhaust flow path 31 of the turbine near the turbine blade aft annulus (not shown). The connector 42 positioned on the tubular member 34 is then connected to a mating fixture 74 at the insertion end of the guide 23 to secure the probe 25 in the guide 23. The connector is positioned on the tubular member 34 and swaged to seal such that when the probe 25 is secured in the guide 23, the measuring junction 41 of the thermocouple element 41 is radially and axially positioned in the flow path 31 of the turbine at a point identical to that of a standard blade path thermocouple assembly measuring junction (e.g., measuring junction 105 of FIG. 6). As shown, the sleeve 66 fits tightly within the end 76 of the guide 23 to provide additional support and vibration damping to the tubular member 34.

The leads of the thermocouple element 40 are connected via extension wires 44, 46 and connectors 54, 56 to a supervisory control device 94, external to the combustion turbine 1, which processes the thermocouple measuring junction data to calculate the blade path temperature within the exhaust cylinder 2 and to control various aspects of the combustion process accordingly.

Simultaneous with the thermocouple function, the dual function probe 25 of the present invention provides a means for extracting exhaust gases 29 from the flow path 31 of the exhaust cylinder 2. Hot gases 29 exhausting from the turbine enter the tubular member 34 of the probe 25 through the circular segment openings 72a, 72b (FIG. 3) in the forward end 35 of the tubular member 34. When the valve 60 of the probe 25 is open, the exhaust gases are able to escape from the tubular member 34 through the outlet 64 of the valve 60. To facilitate extraction, a vacuum pump 88 may be coupled to the outlet 64 via suitable interconnection tubing 78, 82 and 86.

A chemical analyzer 84 may be coupled between the vacuum pump 88 and valve outlet 64 to analyze the chemical content of the extracted exhaust gases. In particular, the chemical analyzer 84 may be used to measure the $NO_x$ content of the exhaust gases. A cooling device 80 may be coupled between the chemical analyzer 84 and the outlet 64 of the valve 60 in order to cool the extracted gases, as needed, to prevent damage to the chemical analyzer 84. Because of the high temperature of the extracted gases, interconnection tubing 78 is preferably made of a material capable of withstanding temperatures approaching 500° F. For example, the interconnection tubing 78 may comprise steel tubing. When the cooling device 80 is employed, however, interconnection tubing 82 and 86 may be made of a less temperature resistant material such as, for example, rubber or polyvinylchloride (PVC).

As the foregoing illustrates, the present invention comprises a dual function probe 25 providing both a blade path thermocouple function and the ability to extract exhaust flow path gases from a combustion turbine for analysis. The present invention may be embodied in other specific forms without departing from the spirit or essential attributes thereof and, accordingly, reference should be made to the appended claims, rather than to the foregoing specification, as indicating the scope of the invention.

We claim:

1. A dual function probe for measuring blade path temperature and for extracting exhause flow gases from a combustion turbine, comprising:

an elongate tubular member having an open end and a sealed end, at least a portion of said tubular member proximate said open end thereof being adapted for insertion into the exhaust gas flow path of the combustion turbine;

an elongate thermocouple element, having a measuring junction and a terminal end, centrally disposed within said tubular member; and an on-off valve coupled to said tubular member proximate said sealed end thereof for allowing exhaust flow gases that enter said open end of said tubular member to exit said tubular member through said valve.

2. A dual function probe as recited in claim 1 wherein said measuring junction of said thermocouple element at least partially protrudes from the open end of said tubular member, and wherein said dual function probe further comprises a support plate coupled to said open end of said tubular member and having an aperture through which said measuring junction of said thermocouple element protrudes to support said thermocouple element in its centrally disposed position within said tubular member.

3. A dual junction probe as recited in claim 1 wherein said terminal end of said thermocouple element extends outward through said sealed end of said tubular member to connect with an external control device.

4. A dual function probe as recited in claim 1 wherein said measuring junction of said thermocouple element comprises a duplex type measuring junction.

5. A dual function probe as recited in claim 1 further comprising a sleeve slidably fitted over the outer surface of at least a portion of said tubular member.

6. A dual function probe as recited in claim 1 further comprising a vacuum pump coupled to said on-off valve to facilitate extraction of exhaust flow gases from said tubular member when said on-off valve is open.

7. A dual function probe as recited in claim 1 further comprising a chemical analyzer coupled to said on-off valve for analyzing the exhaust flow gases extracted through said valve when said valve is open.

8. A dual function probe as recited in claim 7 further comprising a cooling device coupled between said valve and said chemical analyzer to cool the exhaust flow gases to prevent damage to said analyzer.

9. A dual function probe as recited in claim 1 wherein said valve is coupled to said tubular member with a union tee.

10. A dual function probe for measuring blade path temperature and for extracting exhaust flow gases from a combustion turbine, comprising:

an elongate tubular member having a forward open end and a rearward open end, at least a portion of said tubular member proximate said forward open end thereof being adapted for insertion through a guide in the exhaust cylinder of the combustion turbine and into the exhaust gas flow path thereof;

a union tee having an inlet and first and second outlets, said inlet of said union tee being coupled to said rearward end of said tubular member;

an elongate thermocouple element, having a measuring junction and a terminal end, centrally disposed within said tubular member, said terminal end of said thermocouple element extending outward through said first outlet of said union tee, said first outlet of said union tee having a reduced diameter substantially equal to the diameter of said terminal end of said thermocouple element and forming a seal around said terminal end of said thermocouple element defining a sealed end of said tubular member; and an on-off valve coupled to said second outlet of said union tee for selectively allowing exhaust flow gases that enter said forward open end of said tubular member to exit said tubular member through said second outlet of said union tee.

11. A dual function probe as recited in claim 10 wherein said measuring junction of said thermocouple element protrudes from said forward open end of said tubular member, and wherein said dual function probe further comprises a support plate coupled to said forward open end of said tubular member and having an aperture through which said measuring junction of said thermocouple element protrudes to support said thermocouple element in its centrally disposed position within said tubular member.

12. A dual function probe as recited in claim 10 wherein said terminal end of said thermocouple element is adapted to connect with an external control device.

13. A dual function probe as recited in claim 10 wherein said measuring junction of said thermocouple element comprises a duplex type measuring junction.

14. A dual function probe as recited in claim 10 further comprising a sleeve slidably fitted over the outer surface of at least a portion of said tubular member.

15. A dual function probe as recited in claim 10 further comprising a vacuum pump coupled to said outlet of said on-off valve to facilitate extraction of exhaust flow gases from said tubular member when said valve is open.

16. A dual function probe as recited in claim 10 further comprising a chemical analyzer coupled to the outlet of said on-off valve for analyzing the exhaust flow gases extracted from said tubular member.

17. A dual function probe as recited in claim 16 further comprising a cooling system coupled between said valve and said chemical analyzer to cool the exhaust flow gases to prevent damage to said analyzer.

* * * * *